United States Patent Office 3,401,127
Patented Sept. 10, 1968

3,401,127
FLAME-RETARDANT SYNTHETIC RESIN COMPOSITION
Robert James Stephenson, Cwmbran, England, assignor to Monsanto Chemicals Limited, London, England, a British company
No Drawing. Filed Oct. 31, 1963, Ser. No. 320,500
Claims priority, application Great Britain, Dec. 13, 1962, 47,039/62
6 Claims. (Cl. 260—2.5)

This invention relates to flame-retardant materials, and particularly to flame-retardant synthetic resin compositions, as well as to certain new compounds that have been found to have flame-retardant properties.

Many synthetic resins, especially hydrocarbon resins such as polyethylene or polystyrene, have a tendency to burn in air and this is particularly noticeable when the resins are used in an expanded form such as for example foamed polystyrene. It has been proposed to reduce this tendency by adding a flame-retarding agent, for example certain compounds containing a halogen, to the resin in order to impart to it flame-retardant properties. This proposal has not been entirely successful, however, as it has been found that many compounds that would otherwise be good flame-retarding agents have a deleterious effect on the mechanical properties of the resin. It has for example been found difficult to produce a satisfactory flame-retardant foamed polystyrene containing a halogen-containing flame-retarding agent, because the mechanical properties of the polystyrene can be so adversely affected that there is a tendency for the foamed polystyrene to be distorted or for it to collapse.

It is an object of this invention to provide novel flame-retardant synthetic resin compositions.

Another object is the provision of novel flame-retardant styrene polymer compositions, and particularly of foamable and foamed styrene polymer compositions.

A further object is the provision, within the broader scope of the useful flame-retarding agents, of a novel class of flame-retarding agents.

These and other objects are attained through the provision of flame-retardant synthetic resin compositions comprised of a synthetic resin and halogen and hydroxylic group containing esters and ethers as hereinafter described; including as a preferred embodiment, a novel class of flame-retarding agents corresponding to one of the following general structural formulae:

(a) 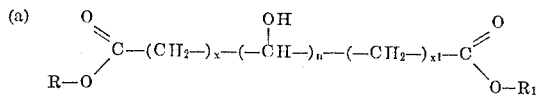

(b) 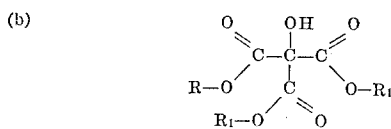

and (c) 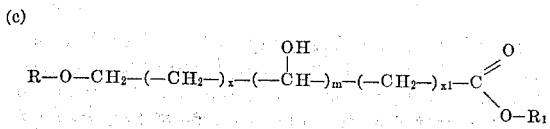

wherein R is a bromoalkyl group of from 1 to 4 carbon atoms and at least one bromine, $R_1$ is either hydrogen or R, $n$ is an integer of from 1 to 4 and $m$ is an integer of from 1 to 4 except when $R_1$ is hydrogen $m$ may be from 0 to 4, and $x$ and $x_1$ are, independently, from 0 to 2.

The following examples are presented in illustration of this invention and are not intended as limitations thereof.

EXAMPLE I

This example describes the production of the compound bis(2,3-dibromopropyl)tartrate by the bromination of diallyl tartrate.

63 grams of bromine are added slowly over a period of 2 hours to a stirred solution of 45 grams of diallyl tartrate in 25 grams of methanol, and the solvent is distilled off under reduced pressure (ca. 20 millimeters of mercury), the maximum distillate temperature being about 60° C. The residue consists of about 105 grams of bis(2,3-dibromopropyl)tartrate in the form of a viscous yellow liquid.

EXAMPLE II

This example describes the production of the compound sorbitol 1,6-bis(2',3'-dibromopropyl)ether by the bromination of corbitol 1,6-diallyl ether.

67 grams of bromine are added slowly to a stirred solution of 52 grams of sorbitol, 1,6-diallyl ether in 20 grams of methanol as in Example I. On removal of the solvent in the same way as in Example I, there are obtained about 120 grams of sorbitol 1,6-bis(2',3'-dibromopropyl)ether.

EXAMPLE III

This example describes the production of the compound glycerol 1,3-bis(2',3'-dibromopropyl)ether by the bromination of the 1,3-diallyl ether of glycerol.

160 grams of bromine are added slowly to a stirred solution of 1,3-diallyl ether of glycerol in 40 grams of methanol, the reaction temperature being maintained at 20–22° C. After a total reaction time of 1.5 hours, traces of unreacted bromine and by-product hydrogen bromide are neutralised by treatment with ammonium hydroxide solution (specific gravity 0.880) and the methanol is removed by distillation at ca. 20 millimeters of mercury pressure. Some solid ammonium bromide is filtered off from the mixture remaining in the flask, yielding about 195 grams of the required product in the form of a yellow viscous oil.

EXAMPLE IV

This example describes flame-retardant foamable and foamed polystyrene materials prepared using the bis(2,3-dibromopropyl)tartrate prepared in Example I.

100 grams of foamable polystyrene beads containing about 6% by weight of a pentane blowing agent are coated evenly with 5 grams of bis(2,3-dibromopropyl)tartrate by tumbling in a drum.

The resulting beads are foamed by exposing them for 4 minutes to steam at a pressure of 9 pounds per square inch gauge, and the foamed beads are then used to mold a foamed polystyrene block having a density of about 1 pound per cubic foot by placing the beads in a mold and injecting steam through small holes in the mold walls. The resulting block of foamed polystyrene is pure white and is found to have excellent mechanical properties and to be free from distortion. The foamed polystyrene is flame-retardant, in that although it burns when ignited it ceases to do so when the source of ignition is removed.

EXAMPLE V

This example describes flame-retardant foamable and foamed polystyrene materials prepared using the sorbitol 1,6-bis-(2',2'-dibromopropyl) ether prepared in Example II.

Example IV is repeated substituting 5 grams of sorbitol 1,6-bis-(2',3'-dibromopropyl) ether for the bis-(2,3-dibromopropyl) tartrate employed therein. The resulting block of foamed polystyrene is pure white and is found to have excellent mechanical properties and to be free from distortion. The foamed polystyrene is flame-retardant, in that although it burns when ignited it ceases to do so when the source of ignition is removed.

EXAMPLE VI

This example describes flame-retardant foamable and foamed polystyrene materials prepared using the glycerol 1,3-bis-(2',3'-dibromopropyl) ether prepared in Example III.

Example IV is repeated substituting 5 grams of glycerol 1,3-bis-(2',3'-dibromopropyl) ether for the bis-(2,3-dibromopropyl) tartrate employed therein. The resulting block of foamed polystyrene is pure white and is found to have excellent mechanical properties and to be free from distortion. The foamed polystyrene is flame-retardant, in that although it burns when ignited it ceases to do so when the source of ignition is removed.

EXAMPLE VII

This example describes flame-retardant foamable and foamed polystyrene materials prepared using tri-(2,3-dibromopropyl) citrate.

Example IV is repeated substituting 5 grams of tri-(2,3-dibromopropyl) citrate for the bis-(2,3-dibromopropyl) tartrate employed therein. The resulting block of foamed polystyrene is pure white and is found to have excellent mechanical properties and to be free from distortion. The foamed polystyrene is flame-retardant, in that although it burns when ignited it ceases to do so when the source of ignition is removed.

EXAMPLE VIII

This example is presented for comparative purposes to describe the mechanical deficiencies of foamable and foamed polystyrene materials prepared using bis-(2,3-dibromopropyl) fumarate; a flame-retarding compound analogous to those of this invention but without hydroxylic groups.

Example IV is repeated substituting 5 grams of bis-(2,3-dibromopropyl) fumarate for the bis-(2,3-dibromopropyl) tartrate employed therein. The foamable beads are observed to become badly creased and then collapse upon foaming. A satisfactory foamed block is not obtained.

The synthetic resin can be any synthetic resin that can advantageously be given a degree of flame-retardancy, but is usually a polymer or copolymer of an ethylenically unsaturated monomer, especially a hydrocarbon monomer, for example, ethylene, propylene, butylene or a styrene such as for instance styrene itself or alpha-methylstyrene. Other suitable monomers are acrylates, such as methyl methacrylate, and vinyl esters, such as vinyl acetate. Other resins that can be used include copolymers of any of the above monomers, for instance with acrylonitrile, butadiene or isoprene, as well as mixtures of two or more of the polymers or copolymers. The process is particularly applicable to polystyrene resins, including polystyrene itself or a toughened polystyrene of the kind that incorporates a minor proportion of a natural or synthetic rubber. The synthetic resin can be one containing a blowing agent, for example a chemical blowing agent or a volatile liquid, and the composition containing the flame-retarding agent can then be used to make a flame-retardant grade of foamed resin. Foamable polystyrene containing a pentane or other volatile hydrocarbon blowing agent can be treated with success.

In general in the flame-retarding agents of this invention the halogen is chlorine or bromine, and it is substituted in an aliphatic radical that is part of the ester or ether. Preferably the halogen is bromine, and the aliphatic radical is an alkyl radical. Where it is an ester the flame-retarding agent can then for example be a halo-aliphatic, such as a bromo-alkyl, ester of an acid containing a hydroxylic group. More than one halogen atom or more than one hydroxylic group can be present; for example an agent can contain two or more bromine atoms. A halo-alkyl group preferably contains up to four carbon atoms, such as an ethyl, propyl or butyl group, although the group can be a higher one if desired. A typical halogen-containing group is a mono- or di- bromopropyl group.

The hydroxylic group can be either a hydroxyl group as in an alcohol or a phenol, or a hydroxyl group present in a carboxyl or sulphonic radical or in an organic phosphonic radical. A hydroxyl group capable of being converted to a salt can be in that form; for example the hydroxyl group present in a carboxyl radical can be in salt form, for instance as an alkali metal or ammonium salt. However, in the preferred flame-retarding agents the hydroxylic group is an alcoholic hydroxyl group; more than one such group can be present if desired.

Halo-aliphatic esters are, as has been stated, the esters of appropriate acids, including monocarboxylic acids such as for instance glycollic, lactic, glyceric, beta-hydroxypropionic and beta-hydroxybutyric acids, and dihydric and polycarboxylic acids such as malic, tartaric and citric acids. A specific example of such an ester is bis(2,3-dibromopropyl) tartrate. Other hydroxyl-containing acids are the dibasic and polybasic acids, organic or inorganic, that have been partially esterified with a dihydric or polyhydric alcohol so that a hydroxyl group is present. Examples of such hydroxyl-containing acids are the monoglyceryl and mono (ethylene glycol) esters of the dicarboxylic and polycarboxylic acids mentioned above and of phosphorus acids such as phosphoric acid, for instance monoglyceryl phosphate. Mono(bromo-alkyl) esters of dicarboxylic and polycarboxylic acids which contain a hydroxyl group in the form of a free carboxyl group are also useful, and examples of these include the appropriate mono-esters of oxalic, malonic, succinic, maleic, fumaric and tricarballylic acids.

Halo-aliphatic ethers that are useful include a bis (halo-aliphatic) ether that contains a hydroxyl group, and a dihydric or polyhydric alcohol partially etherified by means of a halo-aliphatic group. Alcohols that can be partially etherified in this manner are for example ethyleneglycol, propyleneglycol, glycerol, erthritol, pentaerythritol and sorbitol. Excellent results have for instance been obtained with glycerol 1,3-bis(2',3'-dibromopropyl) ether and with sorbitol 1,6-bis(2',3'-dibromopropyl) ether.

The preferred flame-retarding agents correspond to one of the following general structural formulae:

(a) 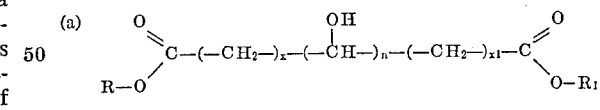

(b) 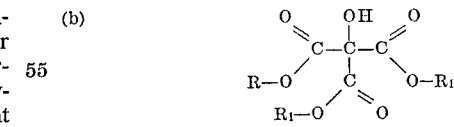

and (c) 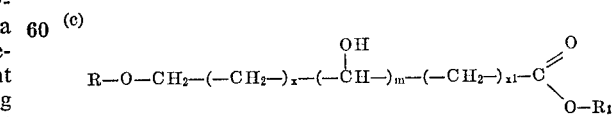

wherein R is a bromoalkyl group of from 1 to 4 carbon atoms and at least one bromine, $R_1$ is either hydrogen or R, $n$ is an integer of from 1 to 4 and $m$ is an integer of from 1 to 4 except when $R_1$ is hydrogen $m$ may be from 0 to 4, and $x$ and $x_1$ are, independently, from 0 to 2. Many members of this class have already been listed in the foregoing discussion and exemplified in the examples. However, other members which can be used with equivalent results include the bromomethyl-, dibromomethyl-, tribromomethyl-, 2-bromoethyl, 1-bromoethyl, 1,2-dibromoethyl-, 2,2-dibromoethyl-, 2-bromopropyl-, 2,3-dibromopropyl-, 3,4-dibromobutyl-, 2,3,4-tribromobutyl-, etc. esters of hydroxyl containing acids such as 1,1-dicarboxylic-1-hydroxy-methane, malic acid, tartaric acid, 1,3-dicarboxylic-1,2,3 - trihydroxy-propane, 1,4 - dicarboxylic - 1,2,3,4 - tetrahydroxy-butane, etc.; citric acid; and ethers of hydroxyl containing alcohols such as ethylene glycol, glycerol, 1,2,3,4-tetrahydroxy butane, 1,2,3,4,5-pentahydroxy pentane, sorbitol, etc. Specific examples include bis-(2,3-dibromopropyl) malate, mono-2,3-dibromopropyl tartrate, bis-[1,3-(2′,3′-dibromopropyl) formate]-1,2,3-trihydroxy-propane, mono-2,3-dibromopropyl citrate, ethyleneglycol mono-2,3-dibromopropyl ether, etc.

These novel compounds are prepared by brominating or hydrobrominating the corresponding ethylenically unsaturated carboxyl containing ester or ether. Useful starting-materials are hydroxyl-containing allyl esters and ethers which when brominated give rise to the preferred dibromopropyl compounds of the invention.

In general, in the process the starting-material is a hydroxylic-containing ester or ether having the ethylenic unsaturation that on bromination will give the desired product.

Returning to the broader class of flame-retarding agents useful in the practice of this invention; in general the flame-retarding agent is of course such that it is substantially involatile at the temperatures at which the chosen synthetic resin is processed. In many instances, this means that the agent has a boiling point of at least 200° C., and preferably at least 250° C.

The flame-retarding agent can be added to the synthetic resin in any convenient way, for example by mixing in a mill or an extruder, but a method which often presents practical advantages is to coat particles of the resin with a thin surface layer that comprises the flame-retarding agent.

Particles of resin that can be used are for example those that result from extruding the resin into a strand that is then chopped up, or those resulting directly from a suspension polymerisation process. Foamable polystyrene beads can be treated effectively. The particles of resin can for example be coated by "tumbling" them in a drum with an appropriate quantity of flame-retardant agent and if desired an adhesive such as an oil or a wax. In other instances, the resin particles can be treated with an aqueous dispersion of the flame-retarding agent so that a surface coating is applied, for instance by coagulating the dispersion.

The amount of flame-retarding agent employed depends on several factors, including the identity of the halogen it contains and the degree of flame-retardancy that it is desired to impart to the synthetic resin, but in general it is preferable to employ sufficient of the agent for the resin material to contain on average between 0.5 and 5%, especially 1 to 3%, such as about 2%, by weight of bromine, or between 2 and 20%, especially between 5 and 15%, by weight of chlorine, based on the weight of the resin.

The flame-retardant compositions of this invention may be extruded or molded into many useful forms and articles. Conventional additives such as pigments, stabilizers, fillers, lubricants, etc., may be employed.

It is obvious that many variations may be made in the compositions and processes herein set forth without departing from the spirit and scope of this invention.

What is claimed is:

1. A flame-retardant synthetic resin composition comprising a synthetic resin which is the polymerization product of at least one ethylenically unsaturated hydrocarbon monomer and a flame retarding agent selected from the class consisting of:

(a) 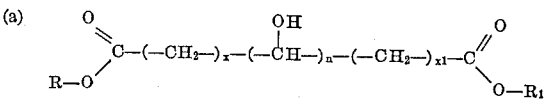

and (b) 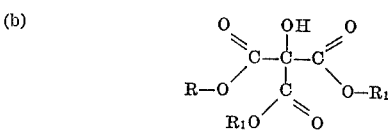

[and]

(c) 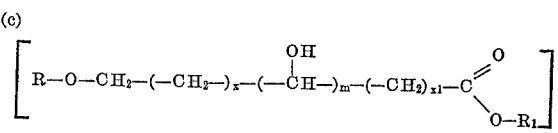

wherein, in each of the above formulae, R is a haloalkyl of from 1 to 4 carbon atoms and at least one halogen wherein in each case the halogen is selected from the class consisting of bromine and chlorine, $R_1$ is selected from the class consisting of hydrogen and R, $n$ is an integer of from 1 to 4, and $x$ and $x_1$ are, independently, from 0 to 2.

2. A flame-retardant synthetic resin composition as in claim 1 which is a foamable composition.

3. A flame-retardant synthetic resin composition as in claim 1 wherein the synthetic resin is a styrene polymer.

4. A flame-retardant synthetic resin composition as in claim 1 wherein the synthetic resin is a foamable styrene polymer.

5. A flame-retardant synthetic resin composition as in claim 1 wherein the flame-retarding agent is bis-(2,3-dibromopropyl) tartrate.

6. A flame-retardant synthetic resin composition as in claim 5 wherein the synthetic resin is a foamable styrene polymer.

References Cited

UNITED STATES PATENTS

| | | | |
|---|---|---|---|
| 3,004,935 | 10/1961 | Raley et al. | 260—2.5 |
| 3,001,954 | 9/1961 | Buchholz | 260—2.5 |
| 3,025,271 | 3/1962 | Borchert | 260—484 |
| 2,765,224 | 10/1956 | Lambrech | 260—484 |
| 2,464,250 | 3/1959 | Moll et al. | 260—45.85 |
| 2,898,323 | 8/1959 | Clark | 260—45.85 |
| 3,009,888 | 11/1961 | Mueller-Tamm et al. | 260—45.7 |
| 3,251,792 | 5/1966 | Homberg | 260—45.85 |
| 3,267,070 | 8/1966 | Tousignant | 260—45.85 |
| 3,275,596 | 9/1966 | Klug et al. | 260—45.85 |

MURRAY TILLMAN, *Primary Examiner.*

M. FOELAK, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,127                        September 10, 1968

Robert James Stephenson

It is certified that error appears in the above identified patent and that said Letters Patent are hereby corrected as shown below:

Column 2, line 17, "corbitol" should read -- sorbitol --.
Column 6, lines 21 to 25, cancel "and"; "(c)"; and the chemical formula.

Signed and sealed this 10th day of February 1970.

(SEAL)
Attest:

Edward M. Fletcher, Jr.
Attesting Officer

WILLIAM E. SCHUYLER, JR.
Commissioner of Patents